(12) United States Patent
Huang-Tsai

(10) Patent No.: US 8,702,284 B2
(45) Date of Patent: Apr. 22, 2014

(54) VEHICLE RUNNING BOARD

(75) Inventor: Li-Yueh Huang-Tsai, Tainan (TW)

(73) Assignee: Lun An Pan Enterprise Co., Ltd., Tainan (TW)

( * ) Notice: Subject to any disclaimer, the term of this patent is extended or adjusted under 35 U.S.C. 154(b) by 90 days.

(21) Appl. No.: 13/368,348

(22) Filed: Feb. 8, 2012

(65) Prior Publication Data

US 2013/0201714 A1    Aug. 8, 2013

(51) Int. Cl.
| | |
|---|---|
| *F21V 21/00* | (2006.01) |
| *F21S 4/00* | (2006.01) |
| *B60Q 1/24* | (2006.01) |
| *B60Q 1/32* | (2006.01) |
| *F21S 8/10* | (2006.01) |

(52) U.S. Cl.
USPC ................... 362/495; 362/545; 362/249.02

(58) Field of Classification Search
USPC ............... 362/146, 238, 240, 249.01, 249.02, 362/249.06, 505, 540, 543–545, 249.14, 362/495
See application file for complete search history.

(56) References Cited

U.S. PATENT DOCUMENTS

| | | | | |
|---|---|---|---|---|
| 1,439,210 A | * | 12/1922 | Webster et al. ............... | 362/495 |
| 4,463,962 A | * | 8/1984 | Snyder ....................... | 280/164.1 |
| 4,544,991 A | * | 10/1985 | Gorsuch ...................... | 362/495 |
| 4,965,704 A | * | 10/1990 | Osborne, Sr. ................. | 362/495 |
| 6,074,074 A | * | 6/2000 | Marcus ........................ | 362/240 |
| 6,382,819 B1 | * | 5/2002 | McQuiston .................... | 362/495 |
| 6,588,782 B2 | * | 7/2003 | Coomber et al. .............. | 280/163 |
| 6,709,137 B1 | * | 3/2004 | Glovak et al. ................. | 362/495 |
| 7,374,322 B2 | * | 5/2008 | Steen et al. .................... | 362/487 |
| 7,901,120 B2 | * | 3/2011 | Droste et al. .................. | 362/509 |
| 8,002,299 B2 | * | 8/2011 | Huang-Tsai ................... | 280/169 |
| 8,231,134 B2 | * | 7/2012 | Huang-Tsai ................... | 280/169 |
| 8,408,773 B2 | * | 4/2013 | Judge ........................... | 362/605 |
| 8,448,968 B1 | * | 5/2013 | Grote et al. .................... | 280/163 |
| 2005/0213351 A1 | * | 9/2005 | Yang ............................ | 362/633 |
| 2011/0026252 A1 | * | 2/2011 | Janos et al. ............... | 362/249.02 |

* cited by examiner

*Primary Examiner* — Peggy Neils
*Assistant Examiner* — Erin Kryukova
(74) *Attorney, Agent, or Firm* — Alan Kamrath; Kamrath IP Lawfirm, P.A.

(57) ABSTRACT

A vehicle running board includes a treadle body, plural luminous members and a decorative plate. The main body is formed with a recessed surface for receiving the luminous members thereon. The luminous members have their upper parts respectively inserted in the through holes of the decorative plate, and are respectively provided with a transparent lamp holder, which has an outer wall formed with an annular projecting edge to resist against the underside of the decorative plate, and mounted thereon with an anti-skid pad. A circuit board received inside the lamp holder is installed with an LED and connected with power wires, and the luminous members are connected in series by the power wires that are connected to the electric power system of a vehicle. By so designing, the vehicle running board has effects of warning and illuminating for insuring safety in use.

4 Claims, 5 Drawing Sheets

VEHICLE RUNNING BOARD

BACKGROUND OF THE INVENTION

1. Field of the Invention

This invention relates to a vehicle running board and, particularly, to one provided thereon with luminous members to enable the vehicle running board to possess effects of warning and illuminating for insuring safety in use.

2. Description of the Prior Art

Since a sport utility vehicle or a minivan is a comparatively high vehicle, it is always hard and inconvenient for passengers to get on or get off such a vehicle, especially for children or the aged persons unable to move freely, and especially for a woman wearing a skirt. Therefore, such vehicles have their two sides respectively assembled with a vehicle running board to aid entry into the vehicle. However, the two running boards of a conventional vehicle respectively protrude out of two sides of the vehicle body. In this case, if the vehicle is parked or takes a U turn at a dim place, it is not easy for the driver of the vehicle or the drivers of other vehicles to perceive the location of the vehicle running board. As a result, failing stepping on the running board may occur. In addition, if the vehicle is parked at a dark place, the correct location and the width of the vehicle running board cannot be seen clearly by the passengers who want to get on or get off the vehicle. Thus, an accident of making a false step and falling down may occur.

SUMMARY OF THE INVENTION

The objective of this invention is to offer a vehicle running board that has effects of warning and illuminating for enhancing safety in use.

The vehicle running board in the present invention includes a treadle body formed with a recessed surface, and a decorative plate received on the recessed surface of the treadle body and bored with a plurality of through holes. The feature of this invention is that a plurality of luminous members are installed on the recessed surface of the main body and respectively inserted in the plurality of through holes of the decorative plate. The luminous members are respectively disposed with a transparent lamp holder, which has an outer wall formed with a projecting edge to resist against the underside of the decorative plate and is provided thereon with an anti-skid pad. A circuit board received in the interior of the lamp holder is installed thereon with an LED and connected with power wires, and the luminous members are connected in series by the power wires that are connected to the electric power system of a vehicle. Thus, the luminous members are respectively inserted out of the through holes of the decorative plate for giving out light, letting the vehicle running board possess effects of warning and illuminating for insuring safety in use.

Further, the recessed surface of the treadle body is bored with a plurality of insert holes respectively having a screw member inserted therein. The decorative plate has its underside formed with a positioning slide groove fixed therein with screw nuts to be respectively and threadably locked with the screw members of the main body for fixedly positioning both the decorative plate and the luminous members on the treadle body.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
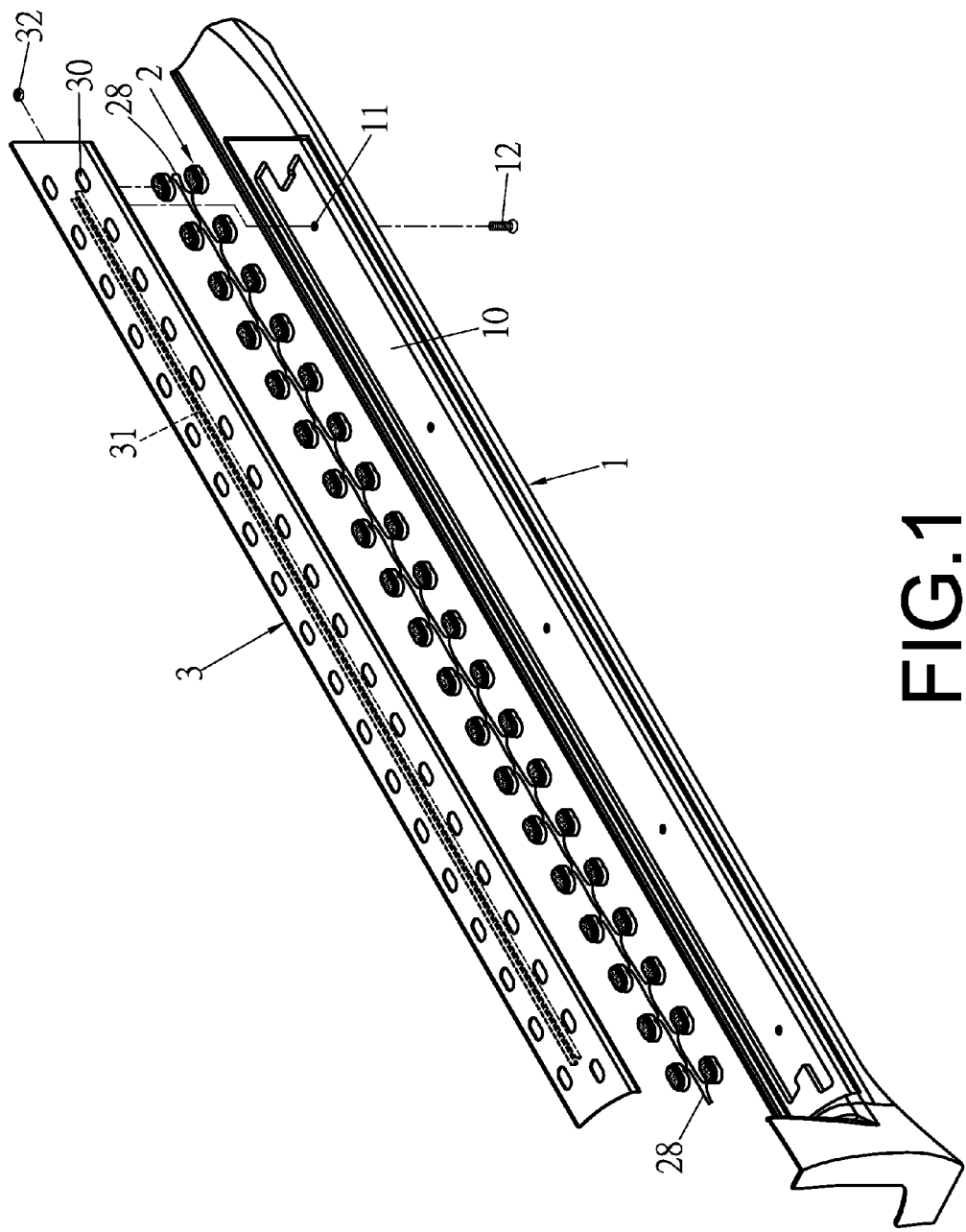
FIG. 1 is an exploded perspective view of a vehicle running board in the present invention.
Figure 2:
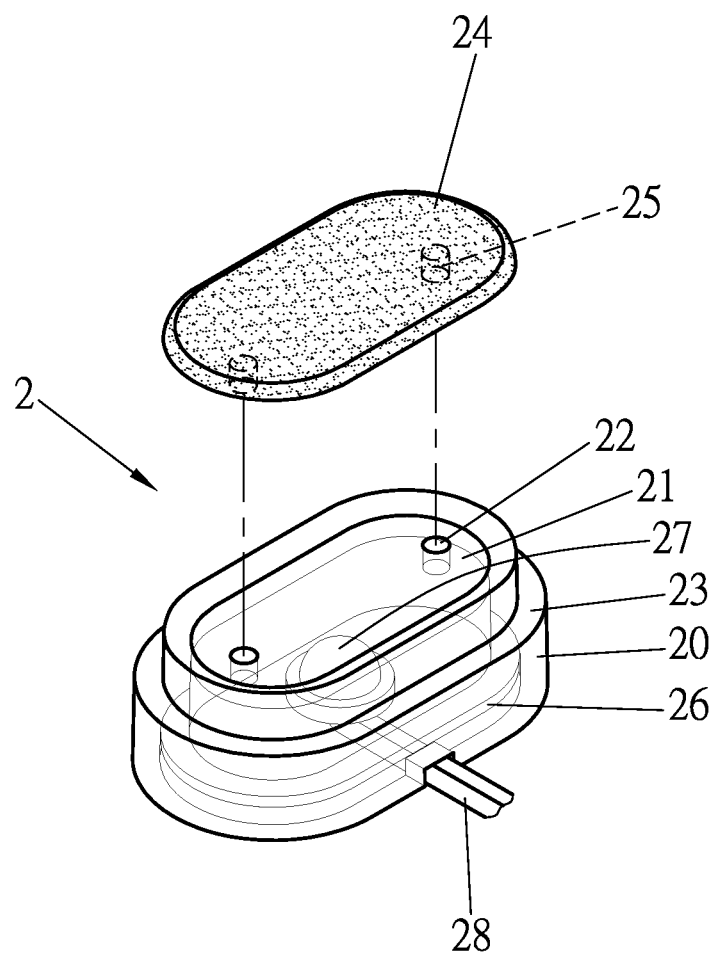
FIG. 2 is an exploded perspective view of a luminous member in the present invention.
Figure 3:
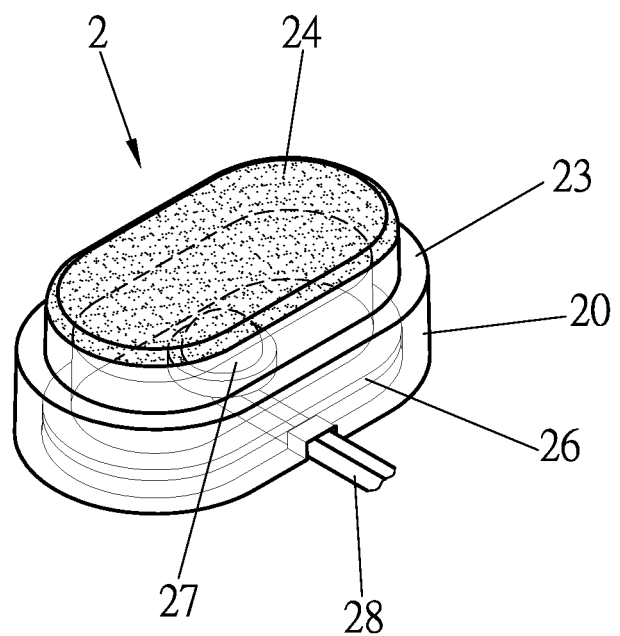
FIG. 3 is a perspective view of the luminous member in the present invention.

A preferred embodiment of a vehicle running board in the present invention, as shown in FIGS. 1-4, includes a treadle body 1, a plurality of luminous members 2 and a decorative plate 3 as main components combined together.

The treadle body 1 is formed with a recessed surface 10 bored with a plurality of insert holes 11 respectively inserted therein with a screw member 12.

The luminous members 2 to be received on the recessed surface 10 of the treadle body 1 are respectively provided with a transparent lamp holder 20, which is formed with a recessed surface 21 bored with two engage holes 22 and has an outer wall annularly disposed with a projecting edge 23. An anti-skid pad 24 is positioned on the recessed surface 21 of the lamp holder 20, having its underside fixed thereon with projecting members 25 to be respectively fitting in the two engage holes 22 of the lamp holder 20. A circuit board 26 received in the interior of the lamp holder 20 is provided thereon with an LED 27 and power wires 28. The luminous members 2 are connected in series by the power wires 28 that are connected to the electric power system of the vehicle.

The decorative plate 3 to be fixed on the recessed surface 10 of the treadle body 1 for positioning all the luminous members 2 is bored with a plurality of through holes 30 for the luminous members 2 to be respectively inserted therethrough and has its underside provided with a positioning slide groove 31 disposed therein with screw nuts 32 to be respectively and threadably locked together with the screw members 12.

In assembling, referring to FIGS. 1-4, firstly, the upper parts of the luminous members 2 are respectively inserted in the through holes 30 of the decorative plate 3 and having the decorative plate 3 together with the luminous members 2 assembled on the recessed surface 10 of the treadle body 1. Subsequently, the screw members 12 are respectively inserted through the insert holes 11 of the treadle body 1 and threadably locked with the screw nuts 32 in the positioning slide groove 31 of the decorative plate 3 for securing both the decorative plate 3 and the luminous members 2 on the treadle body 1, thus finishing assembly of the vehicle running board.

Figure 4:
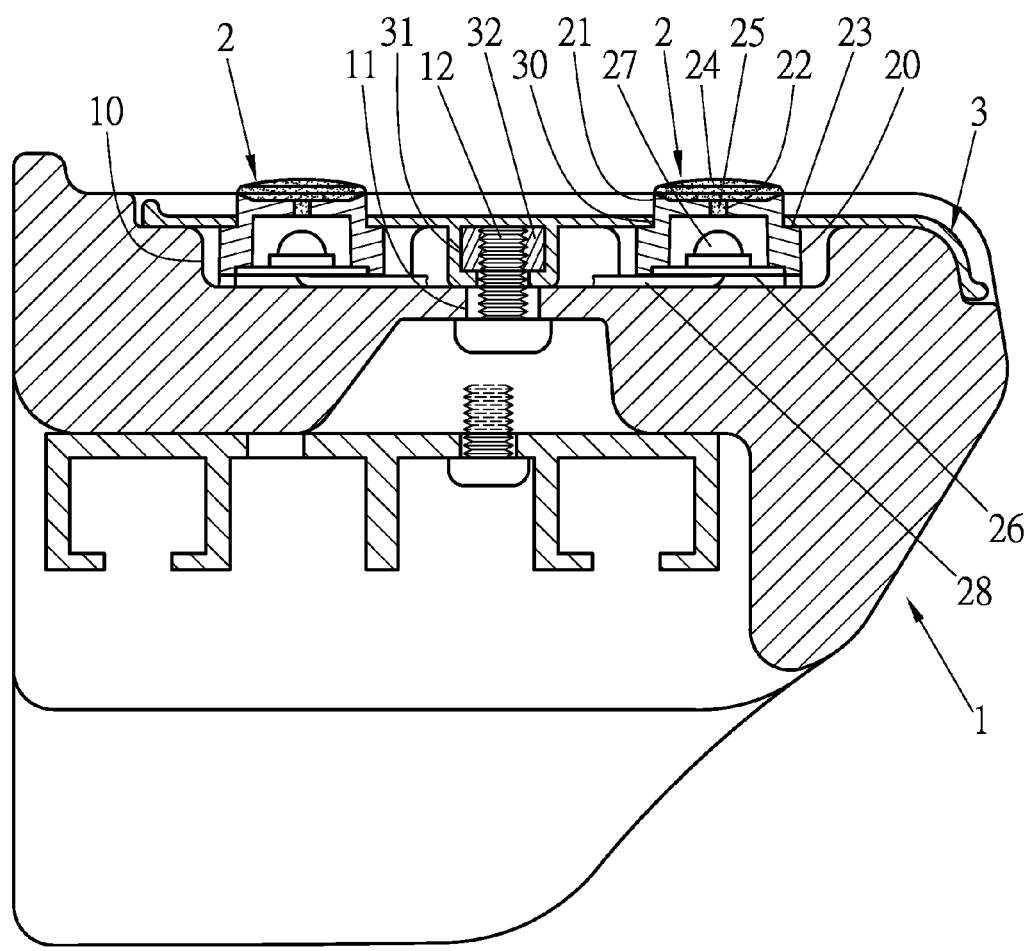
FIG. 4 is a side cross-sectional view of the vehicle running board in the present invention.
Figure 5:
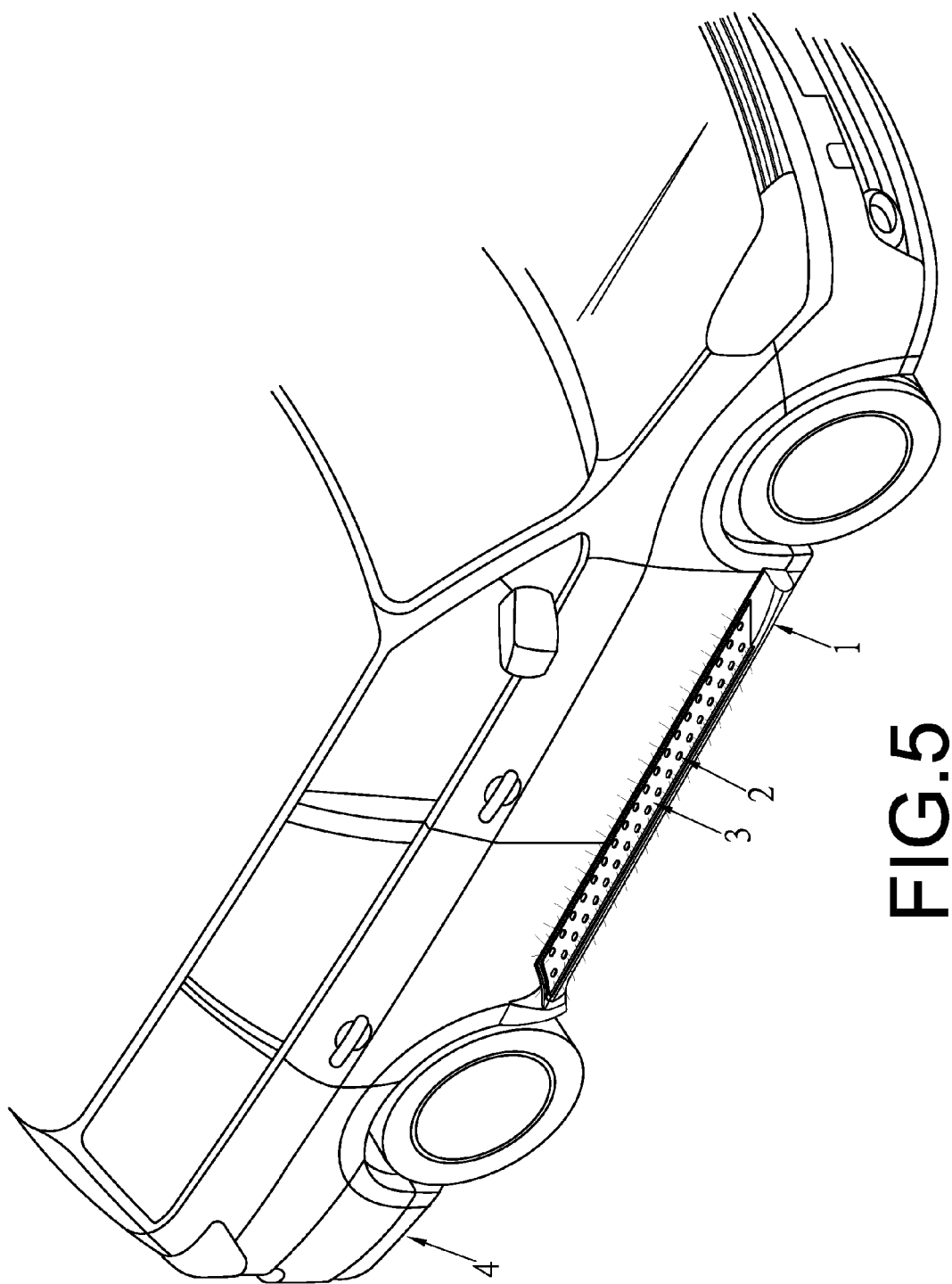
FIG. 5 is a schematic view of the vehicle running board in use in the present invention.

In using, referring to FIGS. 4 and 5, the power wires 28 of the luminous members 2 are connected to the electric power system of a vehicle 4. When the vehicle 4 is parked at a dim place or is driven at night, electricity is turned on to let the luminous members 2 on the treadle body 1 shine. Simultaneously, the light given out by the LED 27 inside the lamp holder 20 will be projected outward through the transparent lamp holder 20 for illuminating the treadle body 1, having effects of lighting and warning and able to prevent passengers from taking a false step and causing an accident, or to avoid the vehicle being scraped or bumped. In addition, the anti-skid pad 24 mounted on the lamp holder 20 is able to prevent slip. Thus, the vehicle running board of this invention can insure safety in use at night.

While the preferred embodiments of the invention have been described above, it will be recognized and understood that various modifications may be made therein and that the appended claims are intended to cover all such modifications that may fall within the spirit and scope of the invention.

What is claimed is:

1. A vehicle running board comprising a treadle body, with said treadle body formed with a recessed surface; a decorative plate secured on said recessed surface of said treadle body, with said decorative plate bored with a plurality of through holes; and a plurality of individual luminous members arranged and spaced from each other on said recessed surface of said treadle body, with each luminous member inserted in one of said plurality of through holes of said decorative plate, with each luminous member including a transparent lamp holder, with each transparent lamp holder having an annular outer wall terminating in a closed top and in a bottom thereof, with the annular outer wall formed with a projecting edge intermediate the closed top and the bottom and abutting against an underside of said decorative plate around the corresponding one of the plurality of through holes, wherein the annular outer wall is received in and projects through the corresponding one of the plurality of through holes, with the decorative plate located intermediate the closed top of the transparent lamp holder and the recessed surface, with the bottom of the transparent lamp holder abutting with the recessed surface, with an anti-skid pad fixed to the closed top of the transparent lamp holder, with the closed top located intermediate the anti-skid pad and the decorative plate, with said transparent lamp holder provided with a circuit board in an interior, with said circuit board installed thereon with an LED in the interior of the transparent lamp holder, with said circuit board connected with power wires, with the circuit board of each luminous member connected to said power wires, with said power wires adapted to be connected to an electric power system of a vehicle.

2. The vehicle running board as claimed in claim 1, wherein said recessed surface of said treadle body is bored with a plurality of insert holes respectively having a screw member inserted therein, wherein said decorative plate has the underside disposed with a positioning slide groove, and wherein said positioning slide groove is fixed therein with screw nuts respectively and threadably locked with said screw members.

3. The vehicle running board as claimed in claim 1, wherein said closed top of the transparent lamp holder of each luminous member is formed with a recessed surface that is bored with engage holes, and wherein said anti-skid pad has an underside provided with projecting members respectively fitting in said engage holes of said transparent lamp holder.

4. The vehicle running board as claimed in claim 3, wherein said recessed surface of said treadle body is bored with a plurality of insert holes respectively having a screw member inserted therein, wherein said decorative plate has the underside disposed with a positioning slide groove, and wherein said positioning slide groove is fixed therein with screw nuts respectively and threadably locked with said screw members.

* * * * *